June 16, 1953 — M. LINTZ — 2,641,849

CEMENT COOLER

Filed Sept. 22, 1950 — 2 Sheets-Sheet 1

INVENTOR.
MARK LINTZ
BY
[signature]
ATTORNEY

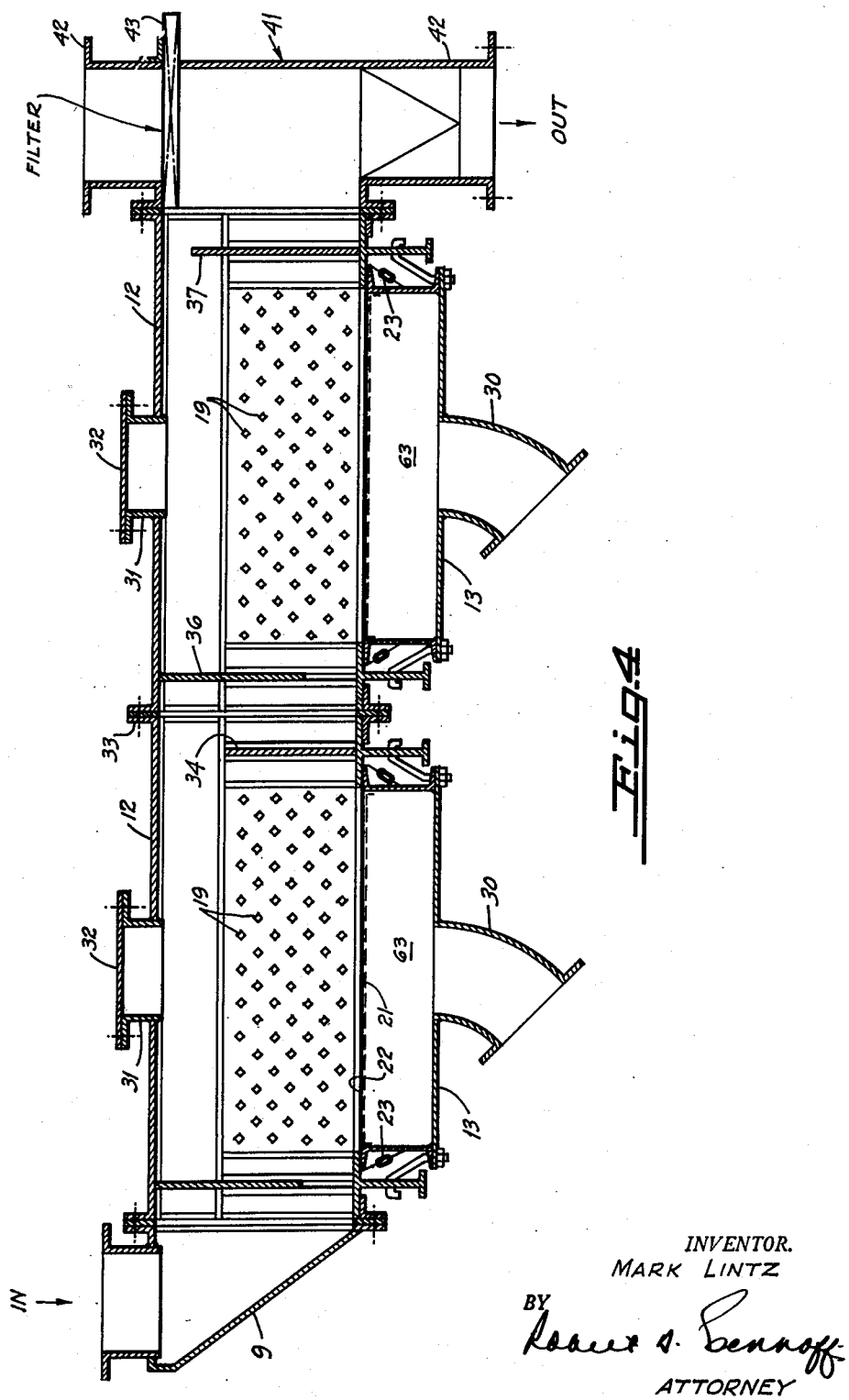

Patented June 16, 1953

2,641,849

UNITED STATES PATENT OFFICE 2,641,849

CEMENT COOLER

Mark Lintz, San Francisco, Calif., assignor to Fuller Company, a corporation of Delaware Application September 22, 1950, Serial No. 186,247

1 Claim. (Cl. 34—57)

This invention relates to the manufacture of a Portland cement.

One of the requirements of a satisfactory Portland cement is that it be ground to a very fine state of subdivision; this is usually carried on in ball mills. To control the setting rate of the cement, it is usual to add gypsum, calcium sulphate containing two mols of water of crystallization. At temperatures of the order of 300° F., the gypsum loses water of crystallization and is thereafter ineffective to control the setting rate of the cement. In some cases it is necessary to spray water directly on the ball mill to maintain the temperature in a range wherein the gypsum is stable and does not lose its water of crystallization.

Cement is usually stored in large silos. Because of its physical nature, a finely ground cement is self-insulating and in the silo it retains the heat present at the time of its deposit; even though the cement is stored in the silo for months, it may still be at a temperature of 150° F. when it is removed. On shipping to a job site in sacks or in large bulk shipments as in trucks or railroad cars, the cement may reach the job at a temperature well in excess of any atmospheric temperature.

In massive concrete structures, such as large dams, the specifications usually require that the concrete deposited must be at a temperature of 40° F. or even less. This involves cooling of the aggregate with ice water or ice, the cooling of the sand, and even the use of ice in the concrete mixer as a source of water. It is obviously impossible to cool the cement with any direct water contact, and yet it is highly desirable to have the cement at as low a temperature as is possible because it provides a substantial portion of the concrete.

The present invention is concerned with the cooling of cement.

In accordance with this invention, air is passed upwardly through the cement in an amount sufficient to fluidize the cement and permit it to flow by gravity over a surface maintained at a temperature below that of the cement, to cool the cement.

It is in general the broad object of the present invention to provide a novel and improved cooler for use on cement and the like.

The invention includes other objects and features of advantage, some of which, together with the foregoing, will appear hereinafter, wherein the present preferred form of cooler of this invention is disclosed.

In the drawing accompanying and forming a part hereof,

Figure 4 is an enlarged section taken through the device shown in Figure 2.

Figure 1:
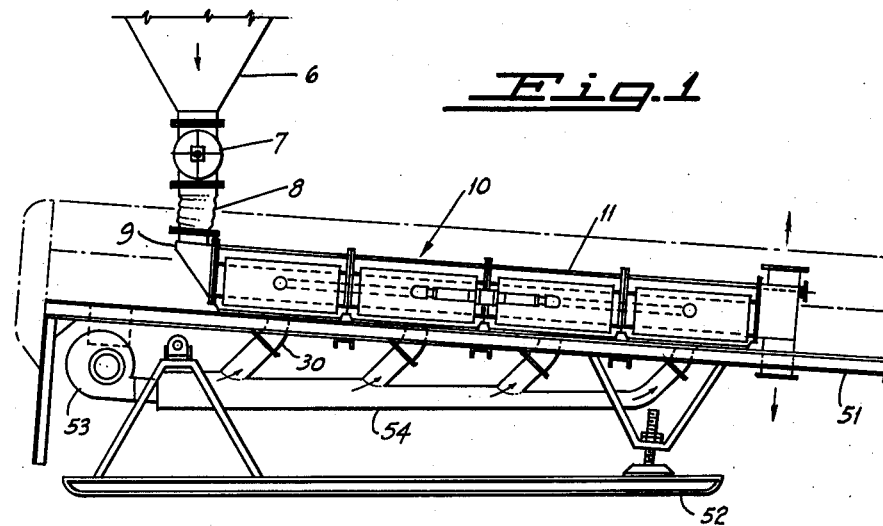
Figure 1 is a side elevation showing one form of complete apparatus embodying the present invention.
Figure 2:
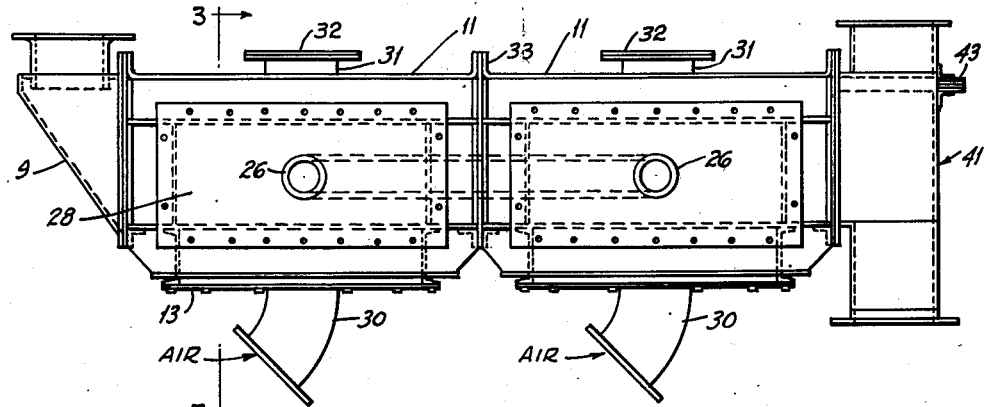
Figure 2 is an enlarged side elevation of another form of the apparatus embodying this invention.
Figure 3:
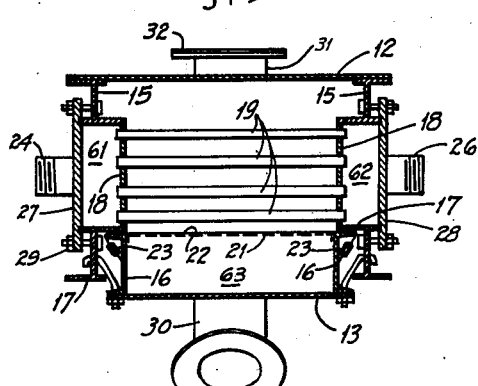
Figure 3 is a section taken along the line 3—3 of Figure 2.

In general, the apparatus of this invention includes a feed hopper 6 connected to a rotary valve 7, the latter being connected by a boot 8 to inlet 9 of the cooling apparatus, generally indicated by numeral 10, and which partially embodies the present invention. The cooling apparatus includes a plurality of several cooling units 11, the number of these being suited to the quantity of cement to be handled; thus, in Figure 1, I have shown the apparatus as including four separate cooling units 11, while in Figures 2, 3 and 4, the apparatus includes two units 11.

Each unit 11 is a generally rectangular box-like structure having cooling fluid headers 61 and 62 on opposite sides, with tubes 19 extended between the headers, horizontally and normal to the flow of cement through the unit. In the apparatus shown, each unit includes a top plate 12 and a bottom plate 13. An eye beam 15 is provided along each side of plate 12, a like beam 17 being provided in a parallel spaced relation. A vertical plate 18 is extended between the inner edge of the flange of beams 15 and 17 to provide the headers 61 and 62 (Figure 3), tubes 19 being extended transversely between the plates 18. The tubes are preferably square in cross section, as appears in Figure 4, and positioned with adjacent faces extending at 45° to the longitudinal axis of the unit and to the flow of cement. The bottom of the unit 11 is closed by an air header 63 in the form of a rectangular box having a beam 16 defining its perimeter.

A heavy screen 21, of about ½" mesh, is extended across the flanges on beam 16, and a suitable canvas sheet 22 is supported on top of this to support the load, the screen and the canvas being maintained taut by the turnbuckles 23 extended between the side edges of the screen canvas and the beam 16. Air is admitted to the header by inlet 30.

Heat exchange fluid inlet and outlets, respectively, indicated at 24 and 26, are provided on cover plates 27 and 28, these being secured by bolts 29 to the flanges of each of beams 15.

An inspection port 31 is provided in each cover plate 12, this being closed by a suitable cover 32. At the end of each unit, angle irons 33 are provided so that the several units can be bolted together.

The several units are arranged in such fashion that the air and cement cannot short circuit through these, and to this end baffles 34, 36 and 37 are provided, as appears in Figure 4, so that the cement must follow a tortuous path through the several units. The baffle arrangement can be varied, depending upon the number of units utilized, and that shown is typical of what can be utilized successfully when two units are assembled.

At the outlet of the last unit is provided a header chamber, generally indicated at 41, and having a riser 42 connected thereto, a porous filter membrane, generally indicated at 43, being provided in the riser so that air can escape from the unit and rise upwardly into a cyclone or other separator, if this be desired, while the cement, cooled to a desired temperature, passes through the down spout 42, into a silo or other collection means employed.

In operation, the several units are assembled upon a suitable framework, such as that indicated at 51, and provided on a base 52 at an angle to the horizontal, so the cement flows by gravity. An air blower 53 is connected by a conduit 54 to each of the inlets 30 on each unit 11. The air supplied need be under only about 2 to 5 inches of water pressure, and the volume is just sufficient to effect the fluidation of cement as it passes through the units. The quantity of air required to effect the fluidation of the cement is relatively small, being only about four cubic feet of air per minute per square foot of filter area in the air header 63. The total volume of air required to effect fluidization of Portland cement is from 10% to 15% on the volume of cement. With this added, the cement flows readily.

The use of rectangular tubes, preferably square heat exchange tubes is preferred, inasmuch as the cement slides off these and does not settle; further, the sliding movement of cement over the surfaces of the tubes improves the exchange efficiency.

The water or other cooling fluid passed through the tubes can be cooled to any temperature desired. Cold water or brine usually suffices. Further, if desired, the air can be cooled additionally. In any case, the air assists in heat transfer because it is in turn cooled by the tubes while the air is in contact with the cement.

The position of the baffles in the casing causes the pulverulent material passing longitudinally through the casing to take a tortuous path. Since the casing is substantially closed to the passage of gas, the gas introduced into the casing for the aeration of the pulverulent material is caused to be formed into an air stream passing in a tortuous path longitudinally of the casing towards the discharge outlet which facilitates the movement of the aerated material through the casing and causes it to be brought into better heat-exchange relation to the cooling tubes which extend transversely of the casing.

From the foregoing, I believe it will be apparent that I have provided a novel and improved apparatus and method for the cooling of cement and like products.

I claim:

A cooler for pulverulent material comprising an elongated casing through which the pulverulent material to be cooled is adapted to pass, the major portion of the bottom of said casing being porous for the passage of a gas therethrough, an air chamber beneath said porous portion of the bottom of the casing, means whereby gas may be introduced into said air chamber for passage upwardly through said porous portion to aerate pulverulent material thereabove, an inlet for the introduction of pulverulent material into one end of said casing, an outlet for the discharge of pulverulent material from the other end of said casing, an outlet for the discharge of gas at said other end of the casing, a plurality of tubes extending transversely of said casing for the passage of a cooling medium, baffles in said casing extending transversely thereof and positioned to cause pulverulent material passing longitudinally through the casing to take a tortuous path, said casing, except for the inlet, the outlet and the porous bottom, being substantially closed to the passage of gas, whereby gas introduced into the casing for the aeration of pulverulent material is caused to be formed into an airstream passing in a tortuous path longitudinally of the casing which facilitates the movement of the aerated material through the casing and causes it to be brought into better heat-exchange relation to said tubes.

MARK LINTZ.

References Cited in the file of this patent

UNITED STATES PATENTS

| Number | Name | Date |
|---|---|---|
| 1,868,512 | Ahlmann | July 26, 1932 |
| 2,094,786 | Flint | Oct. 5, 1937 |
| 2,220,193 | Ahlmann | Nov. 5, 1940 |
| 2,336,378 | Uhlig | Dec. 7, 1943 |
| 2,419,245 | Arveson | Apr. 22, 1947 |
| 2,513,369 | Shaw | July 4, 1950 |
| 2,527,488 | Schemm | Oct. 24, 1950 |
| 2,536,099 | Schleicher | Jan. 2, 1951 |
| 2,567,959 | Munday | Sept. 18, 1951 |

FOREIGN PATENTS

| Number | Country | Date |
|---|---|---|
| 509,909 | Great Britain | 1939 |